United States Patent [19]

Radel et al.

[11] Patent Number: 4,932,991

[45] Date of Patent: Jun. 12, 1990

[54] THIOPYRIDINE-N-OXIDES, THIOPYRIDINES, AND THIOPYRIMIDINES AS UREASE INHIBITORS

[75] Inventors: Robert J. Radel; Michael D. Crenshaw, both of Florence, Ala.

[73] Assignee: Tennessee Valley Authority, Muscle Shoals, Ala.

[21] Appl. No.: 267,153

[22] Filed: Nov. 3, 1988

[51] Int. Cl.$^5$ ............................................. C05G 3/08
[52] U.S. Cl. ........................................ 71/27; 71/902; 71/903
[58] Field of Search ............................. 71/902, 27-30, 71/903

[56] References Cited

U.S. PATENT DOCUMENTS

| 4,517,003 | 5/1985 | Kolc et al. | 71/902 X |
| 4,696,693 | 9/1987 | Swerdloff et al. | 71/902 X |
| 4,808,206 | 9/1989 | Smith | 71/902 X |

FOREIGN PATENT DOCUMENTS 43-26786  11/1968  Japan ............................. 71/902

Primary Examiner—Ferris H. Lander
Attorney, Agent, or Firm—Robert A. Petrusek

[57] ABSTRACT

Newly developed testing procedures have demonstrated that three new classes of compounds, the thiopyridine-N-oxides, the thiopyridines, and the thiopyrimidines are highly effective inhibitors of urease activity in agricultural soil systems. Compositions of urea-containing fertilizers in combination with these materials can be used to reduce ammonia loss and control the activity of the soil enzyme urease in the conversion of urea to ammonia.

12 Claims, 2 Drawing Sheets

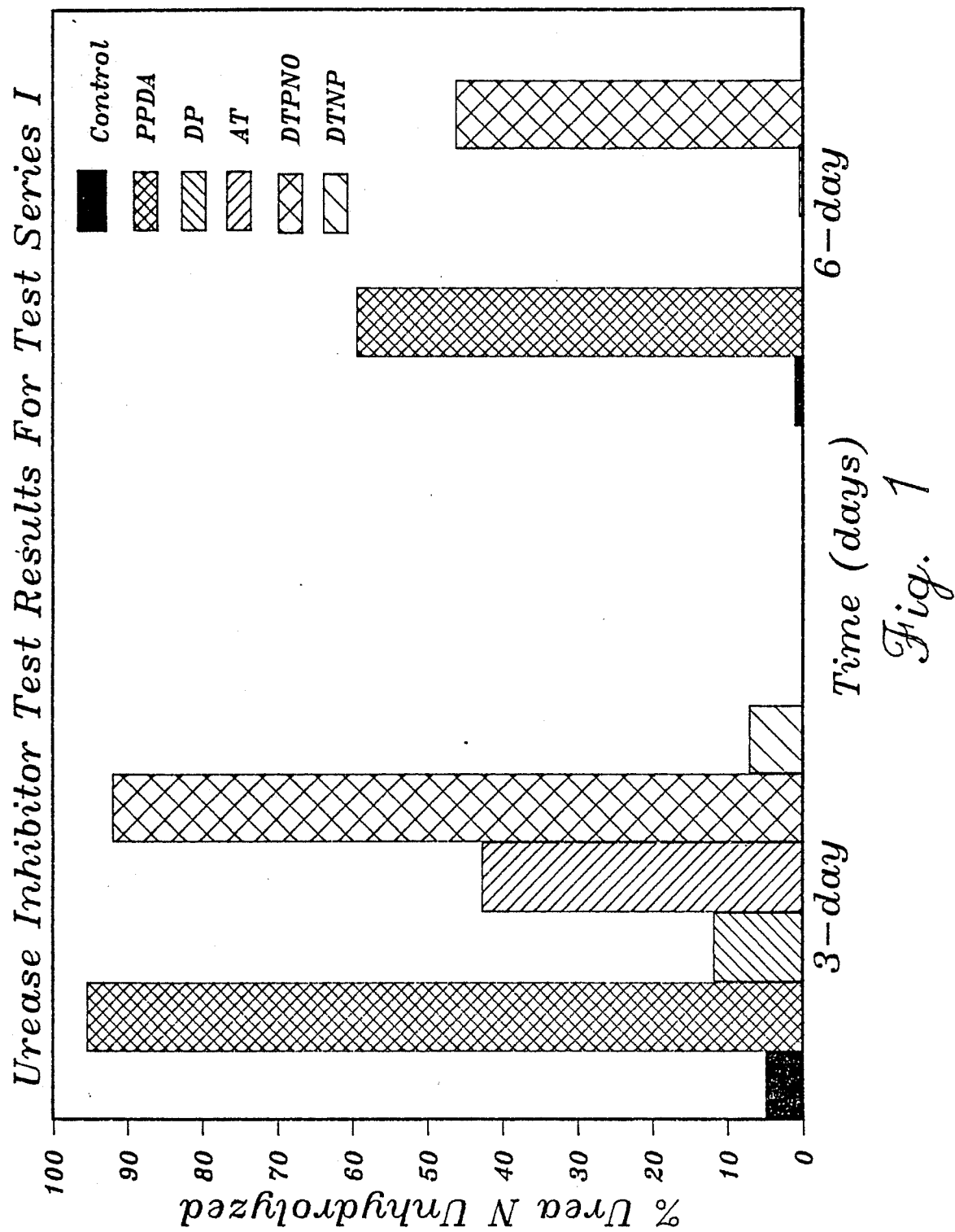

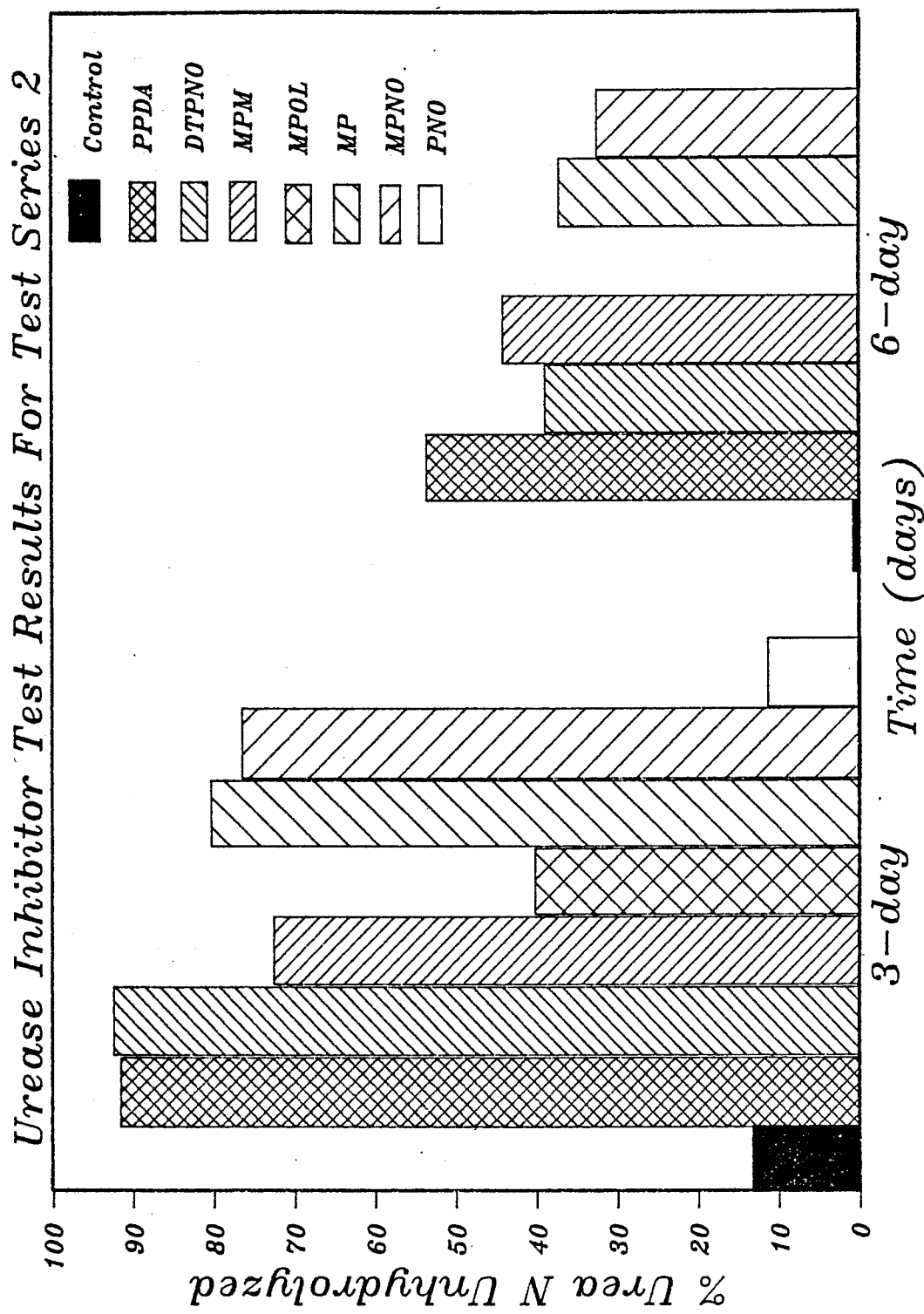

THIOPYRIDINE-N-OXIDES, THIOPYRIDINES, AND THIOPYRIMIDINES AS UREASE INHIBITORS

The invention herein described may be manufactured and used by or for the Government for governmental purposes without the payment to us of any royalty therefor.

INTRODUCTION

The enzyme urease (urea amidohydrolase, EC 3.5.1.5) is a ubiquitous component of many soil systems and has been isolated from a number of microbes and many different plants. In soil systems, urease activities serve to catalyze the hydrolysis of urea to produce ammonia and carbon dioxide according to the following reaction:

$$NH_2CONH_2 + H_2O \xrightarrow{urease} 2NH_3 + CO_2 \quad (1)$$

The ammonia produced is subsequently hydrolyzed to nutrient ammonium salts.

$$NH_3 + H_2O \rightleftharpoons NH_4^+ + OH^- \quad (2)$$

The $NH_4^+$ then is transformed to $NO_3^-$ by aerobic nitrifying bacteria in the soil.

$$NH_4^+ + 2O_2 \rightarrow NO_3^- + H_2O + 2H^+ \quad (3)$$

The sequence of reactions supra serves a vital function in providing inorganic nitrogen for growing plants. However, urease-induced hydrolysis of urea can cause a considerable loss of volatile ammonia, especially when urea fertilizers are surface applied to agricultural soils [Darrell W. Nelson, "Nitrogen in Agricultural Soils," *Am. Soc. Agron.*, 327-358 (1982), Madison, WI]. Most of ammonia volatilization from urea occurs in the first week after application. Moderate delays in urea hydrolysis during this time period can greatly reduce ammonia volatilization losses for several reasons. For instance, the farmer has more time to incorporate urea beneath the soil surface before such ammonia losses occur. There is a greater probability of receiving rain with resulting incipient percolation of fertilizer nitrogen values into the soil before such ammonia losses occur. Also, a larger fraction of the applied nitrogen is converted to $NO_3^-$ before being lost as ammonia.

Urea and urea-containing fertilizers account for more than one-third of the fertilizer nitrogen applied in the United States [N. L. Hargett, J. T. Berry, and S. L. McKinney, *Commercial Fertilizers*, TVA (1987)], and urea accounts for more than 60% of the single-nutrient solid nitrogen fertilizer materials applied worldwide (unpublished TVA data). The economics-based prediction for these percentages shows an increase because urea has a high nitrogen content, low transportation cost, and low production cost relative to alternative nitrogen sources, such as ammonium nitrate and ammonium sulfate. Inasmuch as the relative importance of urea as a primary nitrogen fertilizer is expected to increase to even greater proportions than it now enjoys and substantial amounts of such urea and/or urea-containing fertilizers are applied in situations such as reduced tillage, pastures, and nonmechanized agriculture where it is impractical to mechanically incorporate urea to prevent ammonia volatilization, the development of suitable urease inhibitors is an endeavor of considerable importance for both domestic and international agricultural considerations.

The following subsection provides a short, albeit, less than complete, review of factors which affect soil urease activity. The purpose of this review is to help place in context what has been learned about jack bean urease and urease inhibitors as enumerated in the second subsection infra. The relative significance and/or importance of jack bean urease, as it relates to both the prior art and to this disclosure is referred to near the end of the first paragraph of said second section.

Soil Characteristics and Urease Activity

A number of studies have been carried out investigating the interaction between soil characteristics and urease activity [L. J. M. Verstraeten, "Interaction Between Urease Activity and Soil Characteristics," *Agrochemica* 22, 455-464 (1978); D. E. Stott, C. Hagedorn, "Interrelations Between Selected Soil Characteristics and Arylsulfatase and Urease Activities," *Commun. Soil Sci. Plant Anal.* 11, 935-955 (1980); S. Pal, P. K. Chhonkar, "Urease Activity in Relation to Soil Characteristics," *Pedobiologia* 21, 152-158 (1981); E. Arlauskiene, J. Knesiene, "Effect of Soil Acidity and Fertilization on Urease Activity," *Mikrobiol. Proizvod.* (Dokl. Konf. Mikrobiol. Lit. SSR) 6th, 157-160 (1981); M. I. Zantua, L. C. Dumenil, J. M. Bremner, "Relationships Between Soil Urease Activity and Other Soil Properties," *Soil Sci. Soc. Am. J.* 41, 350-352 (1977)]. In general, the greatest correlation occurs between soil organic matter concentration, total nitrogen content, and the cation-exchange capacity of the soil and its urease activity. Seasonal fluctuations in enzyme activity usually could be ascribed to fluctuations in temperature and soil moisture [D. E. Stott, C. Hagedorn, "Interrelations Between Selected Soil Characteristics and Arylsulfatase and Urease Activites," *Commun. Soil Sci. Plant Anal.* 11, 935-955 (1980)]. In tropical soils, soil organic matter accounts for nearly 77% of the variation in urease activity [S. Pal, P. K. Chhonkar, "Urease Activity in Relation to Soil Characteristics," *Pedobiologia* 21, 152-158 (1981); M. I. Zantua, L. C. Dumenil, J. M. Bremner, "Relationships Between Soil Urease Activity and Other Soil Properties," *Soil Sci. Soc. Am. J.* 41, 350-352 (1977a)] investigated 21 Iowa soils, which also showed urease activity to be highly correlated with soil organic matter, total nitrogen content, and cation-exchange capacity. In addition, these soils exhibited significant correlation between urease activity and clay content, sand content (negative correlation), and soil surface area.

Zantua and Bremner [M. I. Zantua, J. M. Bremner, "Stability of Urease in Soils," *Soil Biol. Biochem.* 9, 135-140 (1977)] also have studied the stability of urease in various samples of Iowa soils. Several treatments of field-moist soils were carried out which had no effect on the activity of the urease. These included: (1) leaching with water, (2) drying for 24 hours at temperatures ranging from 30° to 60° C., (3) storing for six months at temperatures ranging from −20° to 40° C., and (4) incubating under waterlogged conditions at 30° or 40° C. for six months. Inactivation of soil urease was detected at temperatures greater than 60° C. Comparison tests with jack bean urease showed it to be much less stable, even when added to previously sterilized soils.

These reports suggest that the soil urease enzymes are tightly bound to the soil organic matter and that this binding cannot be achieved by simple heterogeneous mixing of urease and soil.

Properties of Jack Bean Urease

Most of the urease inhibitor work related to agricultural systems has been limited to screening programs in which various soil testing systems have been used to screen vast numbers of potential inhibitors. More recently, work has begun in an attempt to understand and define the active site of jack bean urease. Precise definition of this active site would allow a more refined, directed synthesis approach that would be much more cost effective. Most literature reports have indicated that jack bean urease is similar in its activity to bound and unbound soil ureases and it is likely that the active sites also are similar. Nickel nutrition and/or inhibition studies strongly indicate that the active site of urease is essentially the same regardless of its source (mycoplasma, bacteria, fungi, algae, higher plants, invertebrates, and soil) [R. K. Andrews, R. L. Blakeley, B. Zerner, "In Bioinorganic Chemistry of Nickel," T. R. Lancaster, Ed., Verlag Chemie, Derrfield Beach, Fla., in press (1987)]. Bacterial, fungal, and algal ureases have been shown to contain nickel [R. P. Hausinger, "Nickel Utilization by Microorganisms," *Microbiol. Rev.* 51, 22–42 (1987)], though the nickel content appears to vary among the different enzymes. From the information above, it is apparent that soil urease comes from a variety of microbial sources and that they are difficult to isolate and purify. Jack bean urease, on the other hand, is much more easily purified. Thus, this material has been selected by all current researchers in attempts to establish the mechanism of urease inhibition.

A large amount of literature exists which relates to the properties, structure, mechanism of action, and inhibition of the urease enzyme. However, if one sifts through the bulk of this literature, one finds a great deal of inconsistency. Only recently have groups in Australia, the United States, and West Germany reported somewhat consistent results concerning the structure and properties of the urease enzyme.

Although urease was the first enzyme to be isolated as a crystalline protein [J. B. Sumner, "The Isolation and Crystallization of the Enzyme Urease," *J. Biol. Chem.* 69, 435–441 (1926)], there have been a number of conflicting reports in the literature on the molecular weight of the native enzyme (composed of six subunits) and the subunit structure. These reports can be attributed to the difficulty of obtaining a stable and highly pure enzyme. The first urease crystals isolated are now generally considered to be only 70% pure. As a consequence, the native urease molecular weight has been reported between 483,000 [J. B. Sumner, N. Gra'len, I.-B. Eriksson-Quensel, *J. Biol. Chem.* 125, 37 (1938); F. J. Reithel, J. E. Robbins, *Arch. Biochem. Biophys.* 120, 158 (1967)] and 590,000 30,000 mass units [N. E. Dixon, R. L. Blakeley, B. Zerner, "Jack Bean Urease (EC 3.5.1.5), III. The Involvement of Active-Site Nickel Ion in Inhibition by -Mercaptoethanol, Phosphoramidate, and Fluoride," *Can. J. Biochem.* 58, 481–488 (1980a)]. The subunit molecular weight has been documented as existing between 30,000 mass units [S. J. Staples, F. J. R. Reithel, "Evidence for an Activeinactive Subunit Complex in Jack Bean Urease," *Arch. Biochem. Biophys.* 174, 651–657 (1976)] and 96,000 mass units [N. E. Dixon, R. L. Blakeley, B. Zerner, "Jack Bean Urease (EC 3.5.1.5), III. The Involvement of Active-Site Nickel Ion in Inhibition by -Mercaptoethanol, Phosphoramidate, and Fluoride," *Can. J. Biochem.* 58, 481–488 (1980)].

Recently, the arrangement of the subunits in urease was examined. This was accomplished by brief exposure of the enzyme to sodium silicotungstate at neutral pH, followed by analysis with an electron microscope. Hexagonal shapes were observed in strong regions of negative staining, implying that the six subunits were arranged octahedrally or may be viewed as a staggered stack of two trimers [R. L. Blakeley, B. Zerner, "Jack Bean Urease: the First Nickel Enzyme," *J. Mol. Catal.* 23, 263–292 (1984)].

The active site of urease converts urea to carbamate and ammonium ion, which decomposes to carbon dioxide and ammonia. At pH 7 and 38° C., this hydrolysis is approximately $10^{14}$ times as fast as the spontaneous hydrolysis of urea [N. E. Dixon, J. A. Hinds, A. K. Fihelly, C. Gazzola, D. J. Winzor, R. L. Blakeley, B. Zerner, "Jack Bean Urease (EC 3.5.1.5), IV. The Molecular Size and the Mechanism of Inhibition by Hydroxamic Acids," *Can. J. Biochem.* 58, 1323–1334 (1980)]. Up until 1965, urease was considered to be absolutely specific to one substrate, urea; since 1965, 11 additional substrates have been found. It is interesting to note that the efficiency of urea hydrolysis by urease drops 32% at pH 5.2, as compared to hydrolysis rates at pH 7.0. In contrast, the hydrolysis rates for semicarbizide and formamide at pH 5.2 are approximately double that found at pH 7.0. These differences in structure-reactivity relationships appear to strengthen the argument that the Lewis acid, Ni(II), plays a key role in the urease hydrolysis mechanism. An explanation of these results will be deferred until the section on the active site models.

Blakeley and Zener (1984) have examined some of the physicochemical properties of jack bean urease in detail. It appears that the molecular weight and subunit weight found by these authors have been generally accepted.

Urease Enzyme Active Site Models

To date, most programs attempting to identify new urease inhibitors have relied on massive screening efforts. If the active site of the urease enzyme could be adequately defined, a more directed approach could be taken, similar to that in the drug industry, which would allow a more cost-effective method for inhibitor development than currently exists.

Several mechanisms of urease hydrolysis of urea have been proposed. Major advances in this area were made when it was recognized that the metal nickel, played an important role in the hydrolysis of urea [R. L. Blakeley, B. Zerner, "Jack Bean Urease: the First Nickel Enzyme," *J. Mol. Catal.* 23, 263–292 (1984)]. Since this recognition, several other enzymes have been found that contain nickel (Walsh and Orme-Johnson, 1987). The two most recent mechanisms differ mainly in the involvement of nickel at the active site and have been recently reviewed (R. M. Medina, R. J. Radel, "Mechanisms of Urease Inhibitior," in Ammonia Volatilization, D. E. Kissell, B. R. Bock, Editors, In Preparation).

Nickel-Containing Microbial Ureases

A number of other microbes contain urease enzymes. Hausinger recently summarized these microbial ureases, along with their nickel content, subunit molecular weight, and evidence for the nickel [R. P. Hausinger, "Nickel Utilization by Microorganisms," *Microbiol. Rev.* 51, 22–42 (1987)]. The microbes fall into four specific subgroups: bacteria, fungi, algae, and lichen.

BACKGROUND OF THE INVENTION

1. Field of the Invention

In arriving at the gist underlying the concept of the instant invention, it was conceived that a new class of compounds of the general formula:

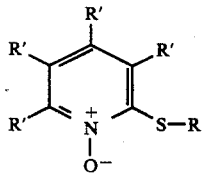

II wherein R can be either hydrogen or a second duplicate molecule (dimer), and R' can be any substituent, should be inhibitors of urease because of the positional proximity of the oxygen-nitrogen-sulfur functional groups in the molecule.

In the course of running comparative experiments to determine the necessity of the N-oxide functional group or the need for the dimeric, it was unexpectedly discovered that two other classes of compounds are also inhibitors of urease in soil systems, to wit, the pyridines and the pyrimidines. The pyridine class is of the general formula:

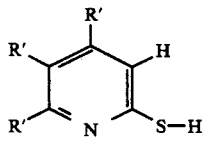

III wherein the ring can be any pyridine compound not substituted in the position alpha to the thiol group and R' can be any substituent.

The pyrimidine class is of the general formula:

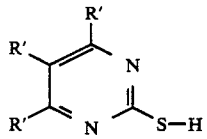

IV wherein the ring can be any substituted or unsubstituted pyrimidine compound, with R' being any substituent.

2. Description of the Prior Art

Compounds Which Inhibit Urease Hydrolysis of Urea: Most enzymes can be poisoned or inhibited by certain chemical reagents. From the study of enzyme inhibitors, valuable information can be obtained about substrate specificity of enzymes, the nature of the functional groups at the active site, and the mechanism of the catalytic activity.

There are two major types of enzyme inhibitors: irreversible and reversible. Irreversible inhibitors combine with or destroy a functional group of the enzyme molecule which is necessary for its catalytic activity. Reversible inhibitors generally are considered to be either competitive or noncompetitive. Competitive inhibitors compete with the substrate for binding to the active site but once bound cannot be transformed by the enzyme. An identifying feature of competitive inhibition is that it can be reversed by increasing the substrate concentration. Noncompetitive inhibitors do not bind at the site on the enzyme at which the substrate does; however, their binding to the enzyme alters the structure or conformation of the enzyme so that reversible inactivation of the catalytic site results.

The type of inhibition that is occurring can be determined by use of enzyme kinetics. However, such kinetic information on enzymes is limited to only a few clinically tested inhibitors, including the reversible inhibitors thiourea [G. B. Kistiakowsky, R. W. Shaw, "On the Mechanism of Inhibition of Urease," *J. Am. Chem. Soc.* 75, 866 (1953)]; phosphoramidate, fluoride ion, β-mercaptoethanol [N. E. Dixon, R. L. Blakeley, B. Zerner, "Jack Bean Urease (EC 3.5.1.5), III. The Involvement of Active-Site Nickel Ion in Inhibition by β-Mercaptoethanol, Phosphoramidate, and Fluoride," *Can. J. Biochem.* 58, 481–488 (1980)]; and hydroxamic acids such as acetohydroxamic acid.

A more empirical approach is to group the known inhibitors into classes according to their structures and how they are throught to interact with the urease enzyme active site. Gould [W. D. Gould, C. Hagedorn, R. G. L. McCready, "Urea Transformations and Fertilizer Efficiency in Soil," *Advances in Agronomy* 40, 209–238 (1986)] has recently suggested classifying inhibitors into three classes: (1) reagents which interact with the sulfhydryl groups (sulfhydryl reagents), (2) the hydroxamates, and (3) structural analogs of urea and related compounds. A special class of compounds can be added, a class containing agricultural crop protection chemicals which have been tested as urease inhibitors. These inhibitors have recently been reviewed in detail by Medina and Radel (R. M. Medina, R. J. Radel, "Mechanisms of Urease Inhibitor," in Ammonia Volatilization, D. E. Kissell, B. R. Bock, Editors, in preparation at the time of this writing).

Sulfhydryl Reagents: Many organic and inorganic compounds, as well as metal ions, have been found to inhibit urease by reacting with the sulfhydryl groups in the enzyme. These may inactivate the enzyme by blocking an active-site group or causing a change in the tertiary structure of the enzyme.

A wide range of organic compounds has been tested as inhibitors (R. M. Medina, R. J. Radel, "Mechanisms of Urease Inhibitior," in Ammonia Volatilization, D. E. Kissell, B. R. Bock, Editors, In Preparation). Most of the early work centered around the toluenes and quinones. Indeed, quite a number of the materials tested contain aromatic or unsaturated functional groups. Some of these materials are thought to be coordinators of nickel and are thus reversible, competitive inhibitors [R. L. Blakeley, B. Zerner, "Jack Bean Urease: the First Nickel Enzyme," *J. Mol. Catal.* 23, 263–292 (1984)].

The quinones inhibit urease activity by blocking essential groups at the active site, either by oxidation of the sulfhydryl group or by formation of addition products [R. Cecil, J. R. McPhee, "Sulfur Chemistry of Proteins," *Adv. Protein Chem.* 14, 255–389 (1959)] with the sulfhydryl group (equation 4). The heterocyclic mercapto compounds of Gould (Gould et al., 1978) appear to inhibit the enzyme by formation of a heterocyclic disulfide with the active-site sulfhydryl group (equations 4 and 5 infra).

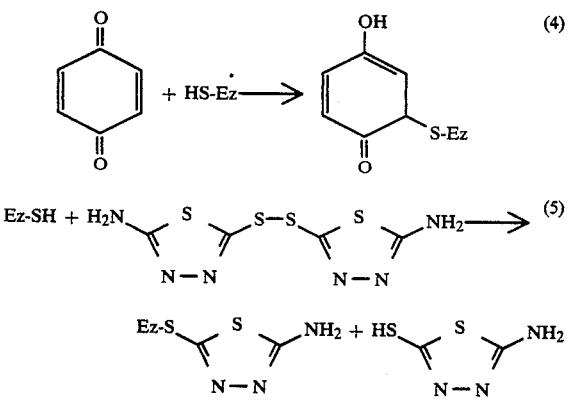

Several inorganic materials have been tested as urease inhibitors (R. M. Medina, R. J. Radel, "Mechanisms of Urease Inhibitior," in Ammonia Volatilization, D. E. Kissell, B. R. Bock, Editors, In Preparation). These materials generally are halide, carbonate, or sulfate salts. In addition, urea phosphate and nitric phosphate have been examined.

Fluoride is a competitive inhibitor which binds to the nickel cation in the active site [R. L. Blakeley, B. Zerner, "Jack Bean Urease: the First Nickel Enzyme," *J. Mol. Catal*, 23, 263–292 (1984)], and the behavior of the other halide probably is similar. It is likely that the acid inhibitors affect the optimum pH for urea hydrolysis rather than directly inhibit the enzyme.

A substantial number of transition metal compounds have been tested as urease inhibitors (R. M. Medina, R. J. Radel, "Mechanisms of Urease Inhibitior," in Ammonia Volatilization, D. E. Kissell, B. R. Bock, Editors, In Preparation). The primary reaction for many of the metals is their reaction with the active sulfhydryl group. The mechanism of inhibition of $C_6H_5Hg(OCOCH_3)$ and most of the other cations is the reaction with the essential sulfhydryl group to form a metal sulfide complex (equation 6 infra).

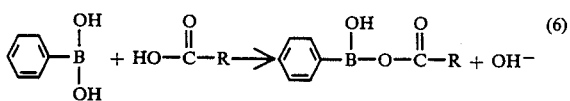

An unusual group of compounds, the arylorganoboron compounds, was patented by Van Der Puy et al. (1984a). We suggest that rather than reacting with the essential sulfhydril group, that these compounds inhibit urease by reacting with the essential carboxylate of the enzyme active site, as shown in equation 7 infra:

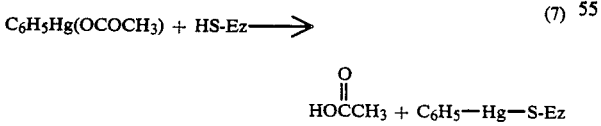

Hydroxamic Acids and Hydroxamates: Dixon [N. E. Dixon, C. Gazzola, R. L. Blakeley, B. Zerner, "Jack Bean Urease (EC 3.5.1.5), A Metalloenzyme, A Simple Biological Role for Nickel?" *J. Am. Chem. Soc.* 97, 4131–4133 (1975)] has shown that hydroxamates inhibit urease by formation of a complex. These compounds are noncompetitive inhibitors [G. R. Gale, L. M. Atkins, "Inhibition of Urease by Hydroxamic Acids," *Arch. Int. Pharmacodyn. Ther.* 180, 289–298 (1969); K. Kobashi, J. Hase, K. Uehara, "Specific Inhibition of Urease by Hydroxamic Acids," *Biochim. Biophys. Acta* 65, 380–383 (1962)] which do not appear to be effective in soil systems [J. M. Bremner, L. A. Douglas, "Inhibition of Urease Activity in Soils," *Soil Biol. Biochem.* 3, 297–307 (1971); Gould et al. (1978)].

Structural Analogs of Urea: Until 1965, urease was thought to be specific to urea as a substrate. Since then, 11 substrates known to react with urease have been identified. As early as 1953 [G. B. Kistiakowsky, R. W. Shaw, "On the Mechanism of Inhibition of Urease," *J. Am. Chem. Soc.* 75, 866 (1953)], structural analogs of urea were found to inhibit urease. Thiourea, methylurea [G. B. Kistiakowsky, R. W. Shaw, "On the Mechanism of Inhibition of Urease," *J. Am. Chem. Soc.* 75, 866 (1953); Shaw, Raval, (1961)]; hydroxyurea [W. N. Fishbein, P. P. Carbone, "Urease Catalysis, II. Inhibition of the Enzyme by Hydroxyurea, Hydroxylamine, and Acetohydroxamic Acid," *J. Biol. Chem.* 240, 2407–2414 (1978)]; dihydroxyurea [W. N. Fishbein, "Urease Catalysis, III. Stoichiometry, Kinetics, and Inhibitory Properties of a Third Substrate: Dihydroxyurea," *J. Biol. Chem.* 244, 1188–1193 (1969)]; and various substituted phenyl ureas [S. Cervelli, P. Nannipieri, G. Giovanni, A. Perna, "Relations Between Substituted Urea Herbicides and Soil Urease Activity," *Weed Res.* 16, 365–368 (1976); S. Cervelli, P. Nannipieri, G. Giovanni, A. Perna, "Jack Bean Urease Inhibition by Substituted Ureas," *Pestic. Biochem. Physiol.* 5, 221–225 (1975)] were among the first. At least one of these, methylurea, has now been shown to act as a substrate rather than an inhibitor [P. V. Sundaram, K. J. Laidler, "Urease-Catalyzed Hydrolysis of Some Substituted Ureas and Esters of Carbamic Acid," *Can. J. Biochem.* 48, 1132–1140 (1970)] and hydroxyurea is simultaneously a substrate and an inhibitor [R. L. Blakeley, B. Zerner, "Jack Bean Urease: the First Nickel Enzyme," *J. Mol. Catal.* 23, 263–292 (1984)].

Recently, a great deal of interest has developed around the organophosphorus inhibitors, particularly the phosphoryl diamidates (R. M. Medina, R. J. Radel, "Mechanisms of Urease Inhibitor," in Ammonia Volatilization, D. E. Kissell, B. R. Bock, Editors, in preparation at the time of this writing). Several of the more potent inhibitors come from this class of materials. In addition, it is likely that the first commercial inhibitor will come from this class of inhibitors. These inhibitors have the general structure shown below

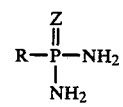

wherein R can be a wide variety of substituents and Z can be oxygen or sulfur.

Agricultural Crop Protection Chemicals: A large number of pesticides and herbicides also have been tested as urease inhibitors (R. M. Medina, R. J. Radel, "Mechanisms of Urease Inhibitior," in Ammonia Volatilization, D. E. Kissell, B. R. Bock, Editors, In Preparation). Although many of these materials inhibit urease, the inhibition effect generally is 30–60% as much as the more powerful phosphoryl diamidates. In several instances, there are conflicting reports indicating increasing, as well as decreasing, urea hydrolysis upon treatment with pesticide materials. It may be that the organophosphorus inhibitors possess crop protection activity as well.

Compounds Related to the Present Invention: Very little work has been reported in which substituted or unsubstituted pyridines have been tested as urease inhibitors. Pyridine-3-sulfonic acid (U.S. Pat. No. 3,547,614, Peterson et al., Dec. 15, 1970) (V), infra nicotinamide (VI), infra and nicotinohydroxamic acid (VII) [H. Junichi, K. Kyoichi, *J. Biochem.* (Toyoko) 62, 293-299 (1967)] have been shown to inhibit urease. Both Hydroxamic acids and sulfonic acids are known inhibitors of urease.

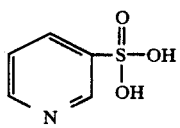

V

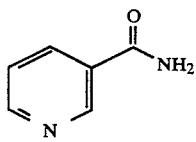

VI

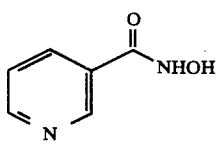

VII

These compounds inhibit the enzyme via these side chains and not through the pyridine moeity itself. Pyridoxine-HCL (VIII) infra is the only pyridine compound which may actually inhibit the enzyme [M. Rosetti, D. E. Mihelle, *Farmacia* 23, 141-146 (1975)].

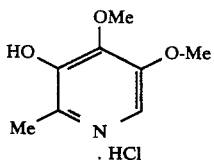

VIII

It may be possible that these new inhibitors and the phosphoroamides have substantially the same mechanism of inhibition, to wit, reacting with the essential sulfhydryl group(s) on the active site(s) of the urease. At this time, however, one can only speculate that the inhibitory properties of these three classes of inhibitors result either from some yet unidentified chemical properties and/or characteristics of the compounds themselves. If the mechanism is related to reacting with, or inhibiting of such sulfhydryl group(s), it might be classified as irreversible inhibition, but more probably as competitive inhibition.

Taking into consideration all of the information supra, one can establish that even though urease has been extensively studied for about 60 years, the mechanism of action and the mechanism of inhibition of this enzyme, especially in heterogeneous environments such as soils, are at best only partially known.

SUMMARY OF THE INVENTION

The present invention relates to three new classes of compounds which have now been shown to be effective as potent urease inhibitors in agricultural soil systems.

Embodiment No. 1 of the present invention provides a new class of urease inhibitors effective in soil systems having the structure shown in II supra, and of the general formula:

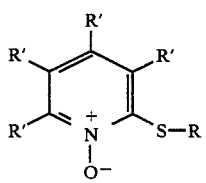

wherein R can be either hydrogen or a second duplicate molecule (dimer) and R' can be any substituent. It has been found that this class of compounds should be inhibitors of urease because of the positional proximity of the oxygen-nitrogen-sulfur functional groups in the molecule.

Embodiment No. 2 of the present invention relates our unexpected discovery that a new class of pyridine compounds are also effective inhibitors of urease in soil systems. This class has the structure shown in III supra, and is given by the general formula:

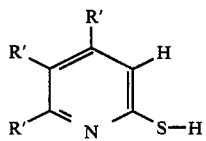

wherein the ring can be any substituted or unsubstituted pyridine as long as the alpha carbon to the thiol group does not contain a substituent except for hydrogen, i.e., R' can be any substituent.

Embodiment No. 3 of the present invention relates to our unexpected discovery that a new class of pyrimidine compounds are effective as urease inhibitors in soil systems. These compounds have the structure shown in IV supra, and are of the general formula:

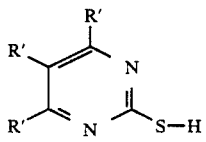

wherein the ring can be any substituted or unsubstituted pyrimidine moiety, i.e., R' can be any substituent.

For ease and convenience of application, any of these three classes of compounds may be incorporated into urea or urea-containing fertilizers by mixing, prilling, granulating, coating, or other means familiar to those knowledgeable in the art of producing and/or blending fertilizer materials, some of which are illustrated in the teachings of the testing methods utilized in our work leading to the discoveries comprising the present invention.

OBJECTS OF THE INVENTION

The principal object of Embodiment No. 1. of the present invention is to identify and characterize a new class of highly effective thiopyridine-N-oxide urease inhibitors.

The principal object of Embodiment No. 2. of the present invention is to identify and characterize a new class of highly effective thiopyridine urease inhibitors.

The principal object of Embodiment No. 3. of the present invention is to identify and characterize a new class of highly effective thiopyrimidine urease inhibitors. It has now been found that any of these three classes of inhibitors will, when admixed with urea or urea-containing fertilizers, prevent or greatly reduce the loss of ammoniacal nitrogen from agricultural soils resulting from the urease-induced hydrolysis of urea.

It is a further object of the present invention to firmly establish that all three of these classes of urease inhibitors can be, if properly utilized, as effective as the most effective inhibitors known up to this time, i.e., phenyl phosphorodiamidate.

Still further and more general objects and advantages of the present invention will appear from the more detailed description set forth in the following descriptions and examples, it being understood, however, that this more detailed description is given by way of illustration and explanation only and not necessarily by way of limitation, since various changes therein may be made by those skilled in the art without departing from the true scope and spirit of the instant invention.

DESCRIPTION OF THE DRAWINGS

The present invention will be better understood from a consideration of the following description taken in connection with the accompanying drawings in which:

FIG. 1 is a graphical representation of urease inhibition as a function of time for Test Series I in a banded soil system. The figure is a bar graph showing the precent urea-N left unhydrolyzed after three-and six-days incubation time for the inhibitors Dithiobis-pyridine-N-oxide (DTPNO), 2,2′-Dipyridyl (DP), Aldrithiol (AT), and 2,2-Dithio-5-nitropyridine (DTNP). Results for PPDA and soil blank plus urea are given for comparison.

FIG. 2 is a graphical representation of urease inhibition as a function of time for Test Series II in a banded soil system. The figure is a bar graph showing the percent urea-N left unhydrolyzed after three-and six-days incubation time for the inhibitors 2,2-Dithiobis-pyridine-N-oxide (DTPNO), 2-Mercaptopyrimidine (MPM), 2-Mercapto-3-pyridinol(MPOL), 2-Mercaptopyridine (MP), 2-Mercaptopyridine-N-Oxide (MPNO), and Pyridine-N-Oxide (PNO). Results for PPDA and soil blank plus urea are given for comparison.

For the sake of convenience and greater appreciation of the results of our discoveries leading to the present invention, more specific references to FIG. 1 and FIG. 2 are combined with the appropriate discussion of pertinent data and presented below in Examples I and II, respectively.

DESCRIPTION OF THE PREFERRED EMBODIMENTS

For ease and convenience of application, compounds from these three classes of inhibitors may be incorporated into urea or urea-containing fertilizers by mixing, prilling, granulating, coating, or other means familiar to those knowledgeable in the art of producing and/or blending fertilizer materials, some of which are illustrated in the following teachings of the testing methods we utilized in our work leading to the discoveries comprising the present invention. In addition to the procedures whereby these compounds are added to the soil system concurrently with the urea or the urea-containing fertilizer same may be added, if desired, before or after such urea or urea-containing materials. Additional pertinent information relating to the preferred embodiment is also found in discussions of the examples combined with FIG. 1, FIG. 2, and the INVENTION PARAMETERS infra.

TESTING METHOD

Urease activity inhibitor test compounds may be evaluated either in aqueous or in soil systems. When aqueous systems are used, urea plus a test compound with possible urease inhibition activity and relatively pure urease enzyme are incubated together to determine the effects of the test compound on urease-catalyzed hydrolysis of urea. When soil systems are used, urea and the test compound are added to moist soil, and the urease enzyme is supplied from the soil. The main disadvantage of using soil systems is that the true activity of test compounds may be masked because of reactions between the test compound and soil. Thus, basic studies for understanding chemical structure-activity relationships are usually performed in aqueous systems. However, soil systems must be used to determine the principal applicability of test compounds since soil can significantly modify inhibitory effects of these compounds.

The most common and conventional method for evaluating potential urease inhibitors in soil systems is to mix both urea and the test compound throughout the soil and determine the effects of the test compound on the rate of urea hydrolysis [L. A. Douglass, J. M. Bremner, *Soil Biol. Biochem.* 3, 309–315 (1971); J. M. Bremner, R. L. Mulvaney, "Urease Activity in Soils," *Soil Enzymes*, Chapter 5, R. G. Burns, ed., Academic Press (1978), 149–195 (1978)].

Test compounds in Example I, infra, were evaluated in soil systems by an alternative procedure in which powdered mixtures of urea and test compounds were applied in narrow bands in the soil rather than being mixed throughout the soil. The banded configuration is not only applicable to banded applications but also results in concentration gradients of urea, urea hydrolysis products, test compounds, and test compound decomposition products similar to those in the immediate vicinity of urea granules containing test compounds. Another advantage of the banded configuration compared with mixing throughout the soil is that slightly soluble test compounds can be easily band applied, whereas it is difficult to achieve a known degree of mixing of a small quantity of slightly soluble test compound with soil. The banded configuration also enables testing for urease inhibition under realistic soil conditions prior to the development of techniques for cogranulating a wide range of test compounds with urea.

Specifics of the procedure for evaluating test compounds in Example I were as follows. Urease-active soil (Hastings silt loam) was moistened to a moisture content of 20% (dry weight basis) and preincubated at room temperature for two days. Plexiglass containers (6×6×6 cm) were one-half filled with soil and packed to a bulk density of 1.1 g/cm$^3$. Urea or urea plus inhibitor (thoroughly mixed) was distributed in a narrow band 6 cm long and about 0.5 cm wide on the soil surface. The containers then were filled with soil, again packing to a bulk density of 1.1 g/cm$^3$. The containers were incubated at 25° C. for the desired reaction period, after which the containers were frozen to about −5° C. to halt urea hydrolysis. Immediately prior to extracting the remaining urea from the soil, said soil was allowed to thaw. Soil from each container was thoroughly mixed, and a 10-g sample was extracted with 100 ml of 2M KCl containing phenylmercuric acetate to prevent urea hydrolysis during handling [L. A. Douglass, J. M. Bremner, *Soil Sci. Soc. Am. Proc.* 34, 859–862 (1970a)]. Urea in the extracts was determined with an automated version of the colorimetric procedure [L. A. Douglass, J. M. Bremner, *Anal. Letters* 3, 79–87 (1970b)].

EXAMPLES

In order that those skilled in the art may better understand the preferred embodiment of the present invention the following examples are given by way of illustration and not necessarily by way of limitation. Names of compounds used in such examples together with the respective abbreviations therefore and their chemical formulas are shown in Table I, infra.

All materials used in these examples were obtained commercially, and no further purification thereof was carried out.

EXAMPLE I

The materials in Test Series I, as shown in Table I below, were obtained as described above. Phenyl phosphorodiamidate was used as reference, and in addition, two blanks were run, one with and one without urea. The relative effectiveness of these new inhibitors was tested by the following procedure.

Urease-active soil (Hastings silt loam) was moistened to a moisture content of 20% and preincubated at room temperature for two days. Plexiglass containers (6×6×6 cm) were one-half filled with soil and packed to a bulk density of 1.1 g/cm$^3$. Urea or urea plus inhibitor (thoroughly mixed) was distributed in a narrow band some 6 cm long and about 0.5 cm wide on the surface of the soil. The containers then were filled with soil and again packed to a bulk density of 1.1 g/cm$^3$. The containers were incubated at 25° C. for the desired reaction period.

TABLE I

| Compounds and Chemical Formulas | |
|---|---|
| Name | Formula |
| TEST SERIES I | |
| Phenyl phosphorodiamidate (PPDA) | $(C_6H_5O)PO(NH_2)_2$ |
| 2,2'-Dipyridyl (DP) | $C_{10}H_8N_2$ |
| Aldrithiol (AT) | $C_{10}H_8N_2S_2$ |
| 2,2-Dithiobis-pyridine-N-oxide (DTPNO) | $C_{10}H_8N_2O_2S_2$ |
| 2,2-Dithio-5-nitropyridine (DTNP) | $C_{10}H_6N_4O_4S_2$ |
| TEST SERIES II | |
| Phenyl phosphorodiamidate (PPDA) | $(C_6H_5O)PO(NH_2)_2$ |
| 2,2-Dithiobis-pyridine-N-oxide (DTPNO) | $C_{10}H_8N_2O_2S_2$ |
| 2-Mercaptopyrimidine (MPM) | $C_4H_4N_2S$ |
| 2-Mercapto-3-pyridinol (MPOL) | $C_5H_5NSO$ |
| 2-Mercaptopyridine (MP) | $C_5H_5NS$ |
| 2-Mercaptopyridine-N-Oxide (MPNO) | $C_5H_5NSO$ |
| Pyridine-N-Oxide (PNO) | $C_5H_5NO$ |

The soil from each container was thoroughly mixed, and 10-g sample was extracted with 100 ml of 2M KCl containing 5 ppm phenylmercuric acetate to prevent urea hydrolysis during handling [L. A. Douglass, J. M. Bremner, *Soil Sci. Soc. Am. Proc.* 34, 859–862 (1970); L. A. Douglass, J. M. Bremner, *Anal. Letters* 3, 79–87 (1970b)]. The urea in the extracts was determined colorimetrically as a measure of the unhydrolyzed urea. The results of three- and six-day tests for equimolar inhibitor contents are given in Table II infra. These results, as well as FIG. 1, show that 2,2'-dithiobispyridine-N-oxide (DTPNO) is as effective an inhibitor as PPDA soil urease activity.

EXAMPLE II

The materials in Test Series II, as shown in Table I supra, were obtained as described above. These materials were tested for their urease inhibition effectiveness in the soil system described above. Phenyl phosphorodiamidate was used as reference and two blanks were also included, one with urea and one without. The inhibitors were tested by the same procedure as in Example I, above. The results of three- and six-day tests for equimolar inhibitor contents are given in Table II infra, and are depicted graphically in FIG. 2. The results confirm that the thiopyridine-N-oxide (DTPNO and MPNO) class of compounds exhibit excellent urease inhibition characteristics when compared to PPDA.

In addition, these tests show that 2-mercaptopyridine (MP) and 2-mercaptopyrimidine (MPM) are excellent urease inhibitors when compared to PPDA.

EXAMPLE III

Several compounds (DP, AT, and DTNP) were added to the testing procedure to demonstrate that the pyridine moeity was not in and of itself responsible for the inhibition of the urease enzyme. The results of our testing procedures with these compounds are also given in Table II, below.

TABLE II

Urea Hydrolysis in Bands of Urea as Affected by Urease Inhibitor Test Compounds Applied at a Rate of 10% Urea (Wt/Wt Basis)$^a$

| N source | Wt mg/band | Inhibitor | Wt mg/band | % inhibition$^b$ | |
|---|---|---|---|---|---|
| | | | | 3 days | 6 days |
| | | TEST SERIES I | | | |
| Urea | 410$^c$ | $C_6H_5OPO(NH_2)_2$ (PPDA) | 41 | 95.6 | 59.6 |
| Urea | 410$^c$ | $C_{10}H_8N_2$ (DP) | 41 | 12.0 | 0.2 |
| Urea | 410$^c$ | $C_{10}H_8N_2S_2$ (AT) | 41 | 42.9 | 0.7 |
| Urea | 410$^c$ | $C_{10}H_8N_2O_2S_2$ (DTPNO) | 41 | 92.2 | 46.4 |
| Urea | 410$^c$ | $C_{10}H_6N_4O_4S_2$ (DTNP) | 41 | 8.6 | 0.5 |
| Urea | 410 | Soil only | — | 0.46 | 0.80 |
| Urea | 410 | Soil + urea | — | 4.9 | 1.07 |

TABLE II-continued
Urea Hydrolysis in Bands of Urea as Affected by
Urease Inhibitor Test Compounds Applied at a
Rate of 10% Urea (Wt/Wt Basis)[a]

| N source | Wt mg/band | Inhibitor | Wt mg/band | % inhibition[b] 3 days | 6 days |
|---|---|---|---|---|---|
| | | TEST SERIES II | | | |
| Urea | 410[c] | Soil only | — | 0.1 | 0.1 |
| Urea | 410[c] | Soil + urea | — | 13.5 | 0.6 |
| Urea | 401[c] | $C_6H_5OPO(NH_2)_2$ (PPDA) | 41 | 92.1 | 54.2 |
| Urea | 410[c] | $C_{10}H_8N_2O_2S_2$ (DTPNO) | 41 | 92.6 | 38.9 |
| Urea | 410[c] | $C_4H_4N_2S$ (MPM) | 41 | 72.8 | 44.6 |
| Urea | 410[c] | $C_5H_5NSO$ (MPOL) | 41 | 40.1 | 0 |
| Urea | 410 | $C_5H_5NS$ (MP) | 41 | 80.2 | 37.8 |
| Urea | 410 | $C_5H_5NSO$ (MPNO) | 41 | 76.8 | 32.2 |
| Urea | 410 | $C_5H_5NO$ (PNO) | 41 | 11.3 | 0 |

[a]Two replicates with Hastings slit loam soil.
[b]As measured by percent urea unhydrolyzed.
[c]Urea N rate equivalent to 100 kg/ha applied in bands 30 cm apart, 6 cm long and about 0.5 cm wide.

As can be seen from the data supra, only Aldrithiol (AT) possesses even the smallest urease activity. The remaining two compounds show essentially no activity useful for the embodiments of the present invention.

EXAMPLE IV

Several compounds (MPOL and PNO) were examined to determine if the N-oxide group alone (MPO) was sufficient to cause inhibition of urease or if the oxygen could be placed on the alpha carbon to the thiol group rather than on the nitrogen. In both cases, significantly lower inhibition occurred.

INVENTION PARAMETERS

After sifting and winnowing through the data supra, as well as other results and operation of our new and novel invention for the use of thiopyridine-N-oxide, thiopyridine, or thiopyrimidines compounds to inhibit the urease catalyzed hydrolysis of urea to ammonia and carbonic acid in solution and soil systems, we now present the principal operating parameters and variables for their use, it being understood that other variables, as considered and discussed supra may alone, or in various combinations be additional viable operational considerations and parameters.

For the use of thiopyridine-N-oxide, thiopyridine, or thiopyrimidine compounds to inhibit the urease catalyzed hydrolysis of urea, the concentration of any one of these compounds in the urea containing fertilizer can range from 0.01 to 10 weight percent of the urea in the fertilizer with 0.5 to 5 weight percent being the preferred concentration and 0.5 to 2 weight percent being the most preferred concentration. The concentration of urea-N in the fertilizer can range up to 47 weight percent, it being understood, however, that urease inhibitors have most utility in fertilizers of high urea content (28–47 weight percent urea-N).

Although urease inhibitors are most useful in fertilizers with high urea nitrogen content, which contain only nitrogen as a fertilizer component, the practice of fertilizer application and use often makes it desirable to mix or blend urea or urea/ammonium containing nitrogen fertilizers with phosphorus and/or potassium containing fertilizers and/or micronutrients. For these applications the urea or urea/ammonium fertilizers containing thiopyridine-N-oxides, thiopyridines, or thiopyrimidines can contain up to 25 weight percent $P_2O_5$ and/or 30 weight percent $K_2O$, and/or 5 weight percent micronutrients.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. A method for controlling enzymatic decomposition of urea juxtaposed soil systems, said enzymatic decomposition of said urea being to ammonia and carbonic acid and being due to the action of the enzyme urease thereupon, said method consisting essentially of exposing said enzyme to relatively small, predetermined amounts of a compound of the formula

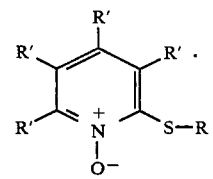

wherein R can be either hydrogen or a second duplicate molecule (dimer) and R' can be any substituent.

2. The method of claim 1, wherein said compound having the formula shown therein is applied before, after, or in conjunction with said urea, which urea is juxtaposed said soil system; and wherein said compound is applied at the rate ranging from about 0.01% to about 10% of the urea wt/wt basis.

3. The method of claim 2, wherein said compound application rate ranges from about 0.5% to about 5% of the urea.

4. The method of claim 3, wherein said compound application rate ranges from about 0.5% to about 2% of the urea.

5. A method for controlling enzymatic decomposition of urea juxtaposed soil systems, said enzymatic decomposition of said urea being to ammonia and carbonic acid and being due to the action of the enzyme urease thereupon, said method consisting essentially of exposing said enzyme to relatively small, predetermined amounts of a compound of the formula

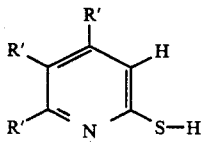

wherein the ring can be any substituted or unsubstituted pyridine as long as the alpha carbon to the thiol group does not contain a substituent except for hydrogen, i.e., R' can be any substituent.

6. The method of claim 5, wherein said compound having the formula shown therein is applied before, after, or in conjunction with said urea, which urea is juxtaposed said soil system; and wherein said compound is applied at the rate ranging from about 0.01% to about 10% of the urea wt/wt basis.

7. The method of claim 6, wherein said compound application rate ranges from about 0.5% to about 5% of the urea.

8. The method of claim 7, wherein said compound application rate ranges from about 0.5% to about 2% of the urea.

9. A method for controlling enzymatic decomposition of urea juxtaposed soil systems, said enzymatic decomposition of said urea being to ammonia and carbonic acid and being due to the action of the enzyme urease thereupon, said method consisting essentially of exposing said enzyme to relatively small, predetermined amounts of a compound of the formula

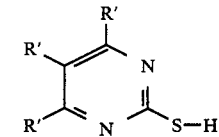

wherein the ring can be any substituted or unsubstituted pyrimidine moiety, i.e., R' can be any substituent.

10. The method of claim 9, wherein said compound having the formula shown therein is applied before, after, or in conjunction with said urea, which urea is juxtaposed said soil system; and wherein said compound is applied at the rate ranging from about 0.01% to about 10% of the urea wt/wt basis.

11. The method of claim 10, wherein said compound application rate ranges from about 0.5% to about 5% of the urea.

12. The method of claim 11, wherein said compound application rate ranges from about 0.5% to about 2% of the urea.

* * * * *